United States Patent
Kramer et al.

(10) Patent No.: US 7,457,874 B2
(45) Date of Patent: Nov. 25, 2008

(54) ARCHITECTURE FOR CONTROLLING ACCESS TO A SERVICE BY CONCURRENT CLIENTS

(75) Inventors: Michael Kramer, Yonkers, NY (US); Marc Seinfeld, Kenmore, WA (US)

(73) Assignee: Microsoft Corporation, Redmond, WA (US)

(*) Notice: Subject to any disclaimer, the term of this patent is extended or adjusted under 35 U.S.C. 154(b) by 748 days.

(21) Appl. No.: 10/783,911

(22) Filed: Feb. 20, 2004

(65) Prior Publication Data

US 2005/0187957 A1    Aug. 25, 2005

(51) Int. Cl.
*G06F 15/173* (2006.01)

(52) U.S. Cl. .................. 709/225; 709/224; 709/229; 705/59; 713/156

(58) Field of Classification Search ......... 709/223–226, 709/229; 705/59, 51; 713/155, 156
See application file for complete search history.

(56) References Cited

U.S. PATENT DOCUMENTS

| | | | |
|---|---|---|---|
| 5,400,402 A * | 3/1995 | Garfinkle | 380/231 |
| 6,018,619 A | 1/2000 | Allard et al. | |
| 6,035,404 A * | 3/2000 | Zhao | 726/6 |
| 6,334,178 B1 | 12/2001 | Cannon et al. | |
| 6,857,067 B2 * | 2/2005 | Edelman | 713/155 |
| 6,915,278 B1 * | 7/2005 | Ferrante et al. | 705/59 |
| 7,003,560 B1 | 2/2006 | Mullen et al. | 709/223 |
| 7,013,294 B1 * | 3/2006 | Sekigawa et al. | 705/59 |
| 7,415,509 B1 * | 8/2008 | Kaltenmark et al. | 709/219 |
| 2002/0010630 A1 * | 1/2002 | Kitamura | 705/14 |
| 2003/0018692 A1 | 1/2003 | Ebling et al. | |
| 2003/0093676 A1 * | 5/2003 | Kawamura et al. | 713/175 |
| 2003/0101190 A1 | 5/2003 | Horvitz et al. | |
| 2004/0003032 A1 | 1/2004 | Ma et al. | |
| 2004/0024875 A1 | 2/2004 | Horvitz et al. | |
| 2004/0054791 A1 * | 3/2004 | Chakraborty et al. | 709/229 |
| 2004/0111725 A1 * | 6/2004 | Srinivasan et al. | 718/105 |
| 2004/0177247 A1 * | 9/2004 | Peles | 713/155 |

(Continued)

FOREIGN PATENT DOCUMENTS

| WO | 0201836 | 1/2002 |
|---|---|---|
| WO | WO 0201836 A2 * | 1/2002 |

OTHER PUBLICATIONS

Ralf C. Hauser, Does Licensing Require New Access Control Techniques?, Communications of the ACM, 1994, pp. 48-55, vol. 37-No. 11.

*Primary Examiner*—Oanh Duong
(74) *Attorney, Agent, or Firm*—Amin, Turocy & Calvin, LLP

(57) ABSTRACT

Architecture for controlling access to a service. The architecture allows denial of regular and periodic service to all but a selected number of concurrent clients associated with a subscriber, and without any manual administration at the server of a list of specific computers. Rather than require an administered list, the system discovers which clients are active, places the active clients on an active list, and excludes all client not on the active list. The system includes rules the enforcement of which provide a mechanism for ensuring that the subscriber is not adding an unlimited number of clients or rotating clients in and out of the pool to effectively maintain service on a larger number of computers to which the subscriber is entitled.

33 Claims, 10 Drawing Sheets

U.S. PATENT DOCUMENTS

2004/0193913 A1* 9/2004 Han et al. .................. 713/200
2004/0250127 A1* 12/2004 Scoredos et al. ............ 713/201
2005/0038751 A1* 2/2005 Gaetano ..................... 705/59
2005/0154887 A1* 7/2005 Birk et al. .................. 713/168

* cited by examiner

ARCHITECTURE FOR CONTROLLING ACCESS TO A SERVICE BY CONCURRENT CLIENTS

TECHNICAL FIELD

This invention is related to software servers systems, and more specifically, to server architecture that facilitates subscriber tracking and administration.

BACKGROUND OF THE INVENTION

A subscription can be issued or purchased that entitles a subscriber to a predetermined number (symbolically "n") of concurrently active clients, where each client runs on a separate machine, and the subscription entitles the clients to access services on a central server. Each client can require periodic but regular service from a server. One challenge with such a mechanism is enforcing a policy or rule that the subscriber is prevented from having more than "n" concurrently active clients. At the same time, it is important to ensure that the subscriber is not systematically rotating the clients that are accessing the server to effectively obtain more service for which they are entitled.

One way to administer this is to assign to each subscriber a unique identifier and to ask the subscriber to explicitly maintain a list of clients that are to be served. This administered list is uploaded to the server, and each time a client attempts to connect to the server, the server checks to determine if the client connecting is on the list of those authorized to connect. The subscriber is responsible of adding and/or removing machines from their authorized list.

One disadvantage of this method is that it places a burden on both the subscriber and the service provider to explicitly maintain lists. The service provider may have to maintain computer-based and telephone-based service center resources to facilitate the maintenance of these lists, which leads to an increased operations expense. The subscriber cannot simply plug in a new client and unplug an old one. The subscriber must maintain a strict database that is up to date or the desired level of service will fail, which also leads to an increased operations expenses. For example, if the subscriber connects a new client to the service, and simply chose to retire an old client, the subscriber cannot do so without access to the list. In a large organization, this represents another burden on the Information Technology administration staff.

One existing scheme for automatic licensing is to use a "floating license" server. A license server is a centralized resource, which is configured to allow "n" simultaneous users to access a resource. The floating license server provides a way for a client to contact the license server, and "check out" a license. After the maximum licenses have been checked out, the server denies additional requests for licenses until some of the existing "checked out licenses" have been released. Some license servers establish a maximum time for a license to be checked out, after which time the client loses the license and has to check it out again. One limitation of the license server approach is as follows. The license server is for environments where continuous access to a resource is meaningful and required. For instance, if a user needs to access an SQL database or an Exchange server, then that access is generally needed continuously. Therefore, all that is required is a floating license scheme where only simultaneous use is measured. The owner of the clients has to purchase enough licenses to satisfy all the number of clients who need to be continuously connected.

What is needed is an improved subscription/licensing management and tracking mechanism.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises architecture that allows client machines to subscribe to a subscription service, and thereafter enter dynamically and on an ad-hoc basis. Thus, when a new client machine of the subscriber authenticates to use the service, it is automatically placed on a list of active allowed machines. However, admittance is subject to checks to ensure that the subscriber has not exceeded their allotted number of simultaneous clients. This limit on simultaneous clients is enforced automatically through activation and enforcement of rules that serve as constraints on the subscriber. A result of automatic enforcement is an elimination of the requirement of tables, and consequently, the need for an administrator to manage the tables.

In another aspect of the present invention, the subscription service enforces a rule related to churn, which is how often any client machine can be placed into service replacing any old machine.

In yet another aspect of the present invention, the subscription service enforces a rule related to frequency, which is the number of times a client can leave service and re-enter service in a given period of time.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
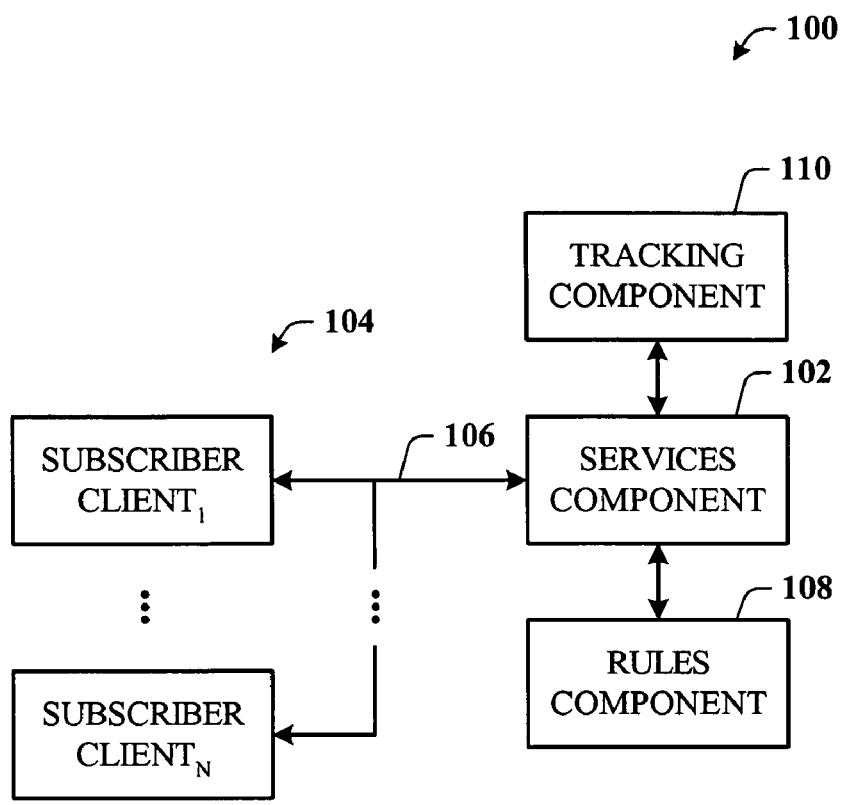
FIG. 1 illustrates a system in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a system 100 in accordance with the present invention. The system 100 allows the denial of regular and periodic service to all but a selected number of concurrent clients associated with a subscriber, and without any manual administration at the server of a list of specific computers. Rather than require an administered list, the system 100 discovers which clients are active, places the active clients on an active list, and excludes all client not on the active list. However, the system 100 cannot be too permissibly dynamic, because if it were such, then there would be no enforcement of limits at all. Therefore, the system includes a system of rules which provide a mechanism for ensuring that the subscriber is not adding an unlimited number of clients or rotating clients in and out of the pool to effectively maintain service on a larger number of computers to which the subscriber is entitled.

In support thereof, the system 100 includes one or more service(s) 102 hosted on a subscription server (not shown) to provide the service(s) to one or more subscriber clients 104 (also denoted SUBSCRIBER CLIENT$_1$ ... SUBSCRIBER CLIENT$_N$). The clients 104 access the service(s) dynamically and on an ad hoc basis via a network 106, which network 106 can be, for example, a wired/wireless connection over a LAN, WAN, and the Internet. The clients 104 include at least personal computers, portable computers, PDAs, and portable communication devices, any or all of which can access the service(s) via conventional communication means. In accordance with the present invention, the system 100 also includes a rules component 108 that facilitates enforcement of one or more rules against an account of the subscriber. The rule include, for example, a limit on the number of concurrently connected clients, a "churn" limit on the number of clients that can be replaced in a given period of time, and a "frequency" limit on the number of times a given client can re-subscribe to the service(s) over a given period of time.

It is also to be appreciated that the one or more imposed on a first subscriber can be the same, different or partially overlapping in some respects to one or more rules imposed on a second subscriber. Thus, there can be many different sets of rules available in the system 100 to be imposed on the clients of the various subscribers.

The system also includes a tracking component 110 that facilitates tracking client activity of a subscriber, and billing the subscriber accordingly. For example, where the subscriber is allowed to exceed the churn and/or frequency parameters, the tracking component 110 logs this activity (e.g., on the active list) and bills the subscriber for the excess usage.

Throughout this description, the language of client/server computing will be utilized; however, the present invention applies equally to peer-to-peer computing where access control is required to limit the number of peers accessing each other.

With respect to a floating license server, the following limitations are addressed by the present invention. Oftentimes, continuous access to a server is not required, and it would serve the customer to purchase a very small number of client licenses and to rotate license check-out among a very large number of clients. In this case, the license server is only too happy to oblige. A customer can purchase a small number of licenses, and then cycle thousands of clients through those few licenses, and the existing prior art would not limit that usage. The license server does not track the identities of the floating licenses, and if any control over licensees is supported by the floating license server, it requires manual administration to limit the check out in any way. The present invention automatically provides licenses to clients, but does not allow an anonymous rotation of many more clients than are authorized by number.

Figure 2:
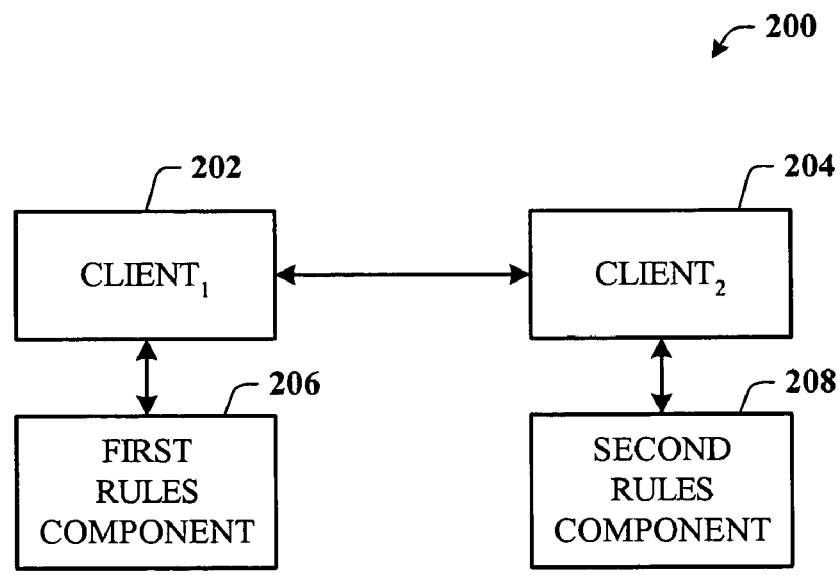
FIG. 2 illustrates a peer-to-peer system in accordance with the present invention.

Referring now to FIG. 2, there is illustrated a peer-to-peer system 200 in accordance with the present invention. In the implementation, the system 200 includes two interconnected peer clients (similar to the clients 104 of FIG. 1): a first peer client 202 (denoted Client$_1$), and a second peer client 204 (denoted Client$_2$). Note, however, that any number of clients can be connected in a peer-to-peer topology. The first client 202 has associated therewith a first rules component 206 that facilitates the imposition of one or more rules on the second client 204 when seeking to connect to the first client 202. Similarly, the second client 204 has associated therewith a second rules component 208 that facilitates the imposition of one or more rules on the first client 202 when seeking to connect to the second client 204. The one or more rules can include, but is not limited to, limiting the number of times that a peer can connect to another peer and limiting the frequency at which one peer connects to another peer.

It is also to be appreciated that the rules of the first rules component 206 can be different or partially overlapping in some respects to the rules imposed by the second rules component 208. Thus, the first client 202 can limit the frequency of the second client 204, yet the second client 204 cannot limit the frequency of the first client 202.

Figure 3:
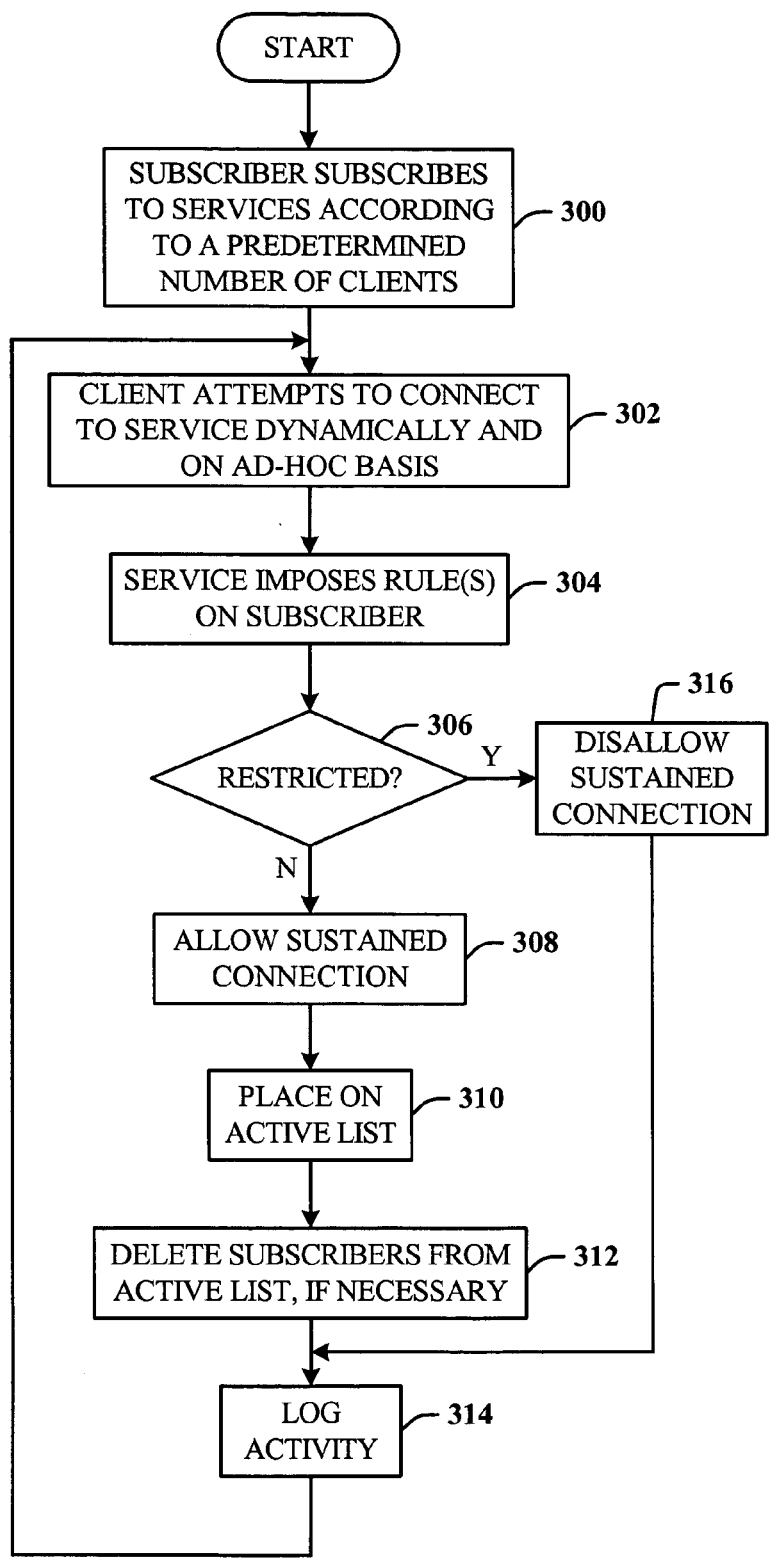
FIG. 3 illustrates a flow chart of a subscription process of the present invention.

Referring now to FIG. 3, there is illustrated a flow chart of a subscription process of the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 300, a subscriber subscribes to a subscription service according to a predetermined number of clients. At 302, a new client attempts to connect by authenticating to the service dynamically and on an ad-hoc basis. At 304, the service imposes one or more rules on the subscriber. At 306, the service determines if the new client is restricted from staying connected to the service. If not, flow is to 308 to allow the client to stay connected to obtain the service. That is to say, the client needs to connect to establish its identity, and the server to determine if the client is allowed service. At 310, the client is placed on an active list of clients that are currently connected in accordance with the subscriber account. At 312, one or more subscribers can then be deleted from the active list, if necessary. At 314, this activity can be logged. Flow is then back to the input of 302 to process any other clients that are attempting to connect to the service.

If the service imposes a restriction on the new client connecting, flow is from 306 to 316 to disallow the sustained connection. Flow is to 314 to log this activity.

In one implementation, along with a limit on the maximum number of simultaneous machines in service, two additional rule constraints are placed on the subscriber. However, in one embodiment, if the rule for the number of concurrent clients is not broken, the client is automatically allowed the sustained connection no matter what the outcomes are for any of the remaining rules. In another implementation, the connecting client must meet all of the rules before a sustained connection is allowed. A second rule addresses the allowed "churn", which is how often any new machine can be placed into service replacing any old machine, and a third rule addresses the allowed re-subscription frequency of an individual machine. The churn can be defined in terms of number of new systems allowed to enter service per day or per week, or per month (once the subscription maximum "n" has been reached). The allowed re-subscription frequency can be defined in terms of the number of times a computer can leave service and re-enter service per week or per month, or per year.

Note that each service will have a characteristic time limit for churn and disallowed client rotations that make unique sense for that particular service. If efficient operation of the system requires the client to get an update only every six months, then the timeframe to disallow churn is keyed to that six-month interval. Similarly, for the rotation time frame, if efficient operation of the system requires the client to contact the server only every six months, then the timeframe to disallow rotation of the clients is keyed to that six-month interval.

Figure 4:
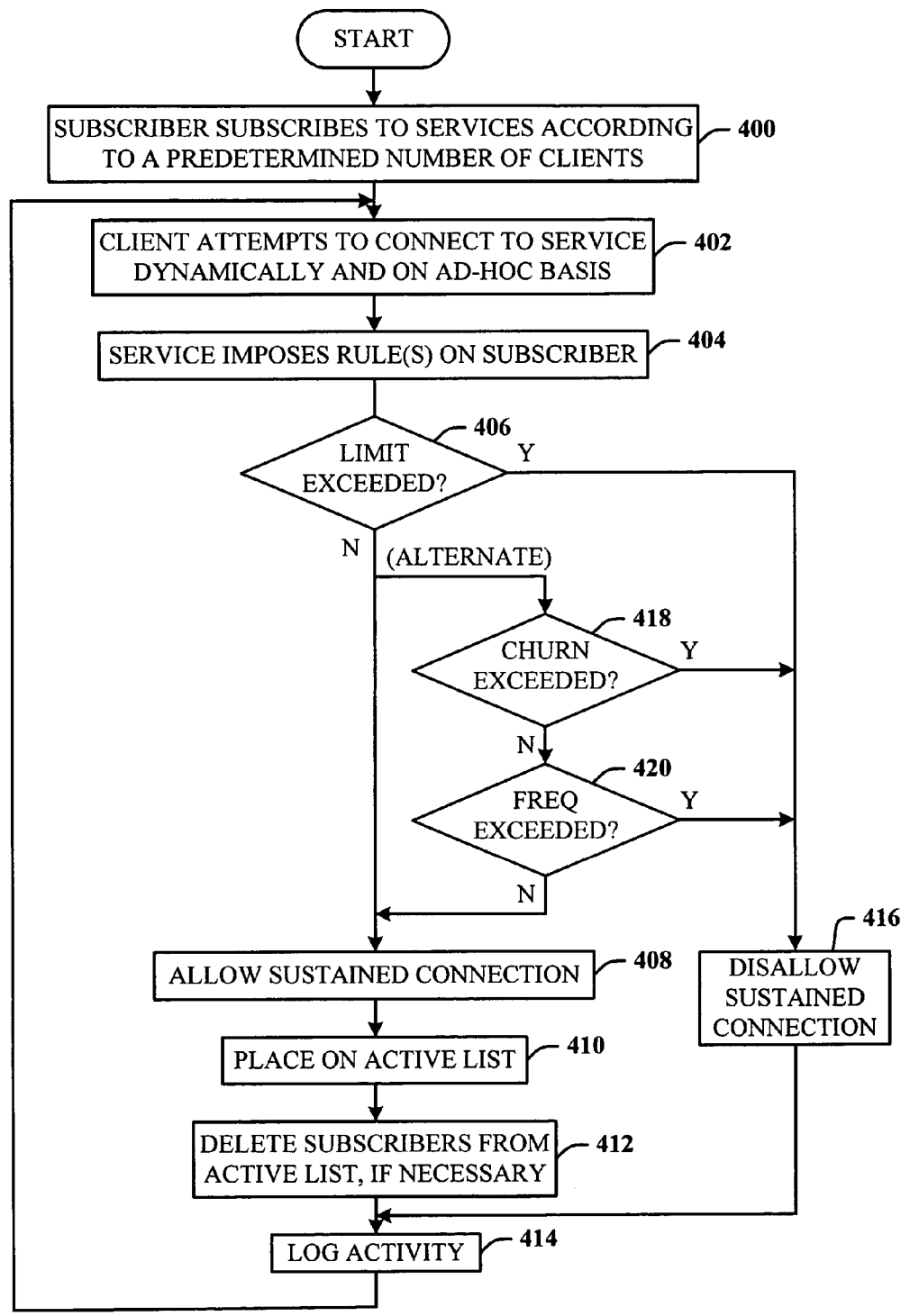
FIG. 4 illustrates a flow chart of a subscription process where additional rules are imposed in accordance with the present invention.

Referring now to FIG. 4, there is illustrated a flow chart of a subscription process where additional rules are imposed in accordance with the present invention. At 400, the subscriber subscribes to one or more services according to a predetermined number of clients. At 402, a client attempts to connect to the service dynamically and on an ad-hoc basis. At 404, the service imposes one or more rules on the subscriber account. At 406, the system determines if the limit on the number of concurrent clients has been exceeded. As indicated previously, this can be an overriding rule that automatically allows the client a sustained connection. Thus, any remaining rules are not processed against this client. Accordingly, flow is to 408 to allow a sustained connection for the client. At 410, the client is placed on the active list. At 412, if necessary, one or more subscribers can be deleted from the active list. Flow is then to 414, where the system logs this activity for processing. Flow is then back to 402 to process the next attempted client connection.

If the system determines that the concurrent client limit has been exceeded, flow is from 406 to 416 to disallow a sustained connection to the client. Flow is to 414 to again log the activity.

In an alternate implementation where the client must adhere to one or more rules in addition to the concurrent client limit rule, if it is determined at 406 that the number of concurrent clients has not been exceeded, flow is to 418 to determine if the churn has been exceeded. If so, flow is to 416 to disallow the sustained connection. If the churn limit has not been exceeded, flow is from 418 to 420 to determine if the frequency has been exceeded. If so, flow is to 416 to disallow the sustained connection. If none of the subscription rules have been broken or exceeded, flow is from 420 to 408 to allow the client a sustained connection, and place the client on the active list, as indicated at 410. Flow then continues in accordance with the above description.

In the preceding discussion, it was assumed that the server would apply the limitations of access at the time that a client entered service, and would deny access to a client that exceeded any of the thresholds. Another strategy would be to admit all clients to access the server, calculate the number of active clients in the system, and charge the customer a fee based on the number of active clients. This approach allows subscription tracking done offline as part of the billing and rating process.

Figure 5:
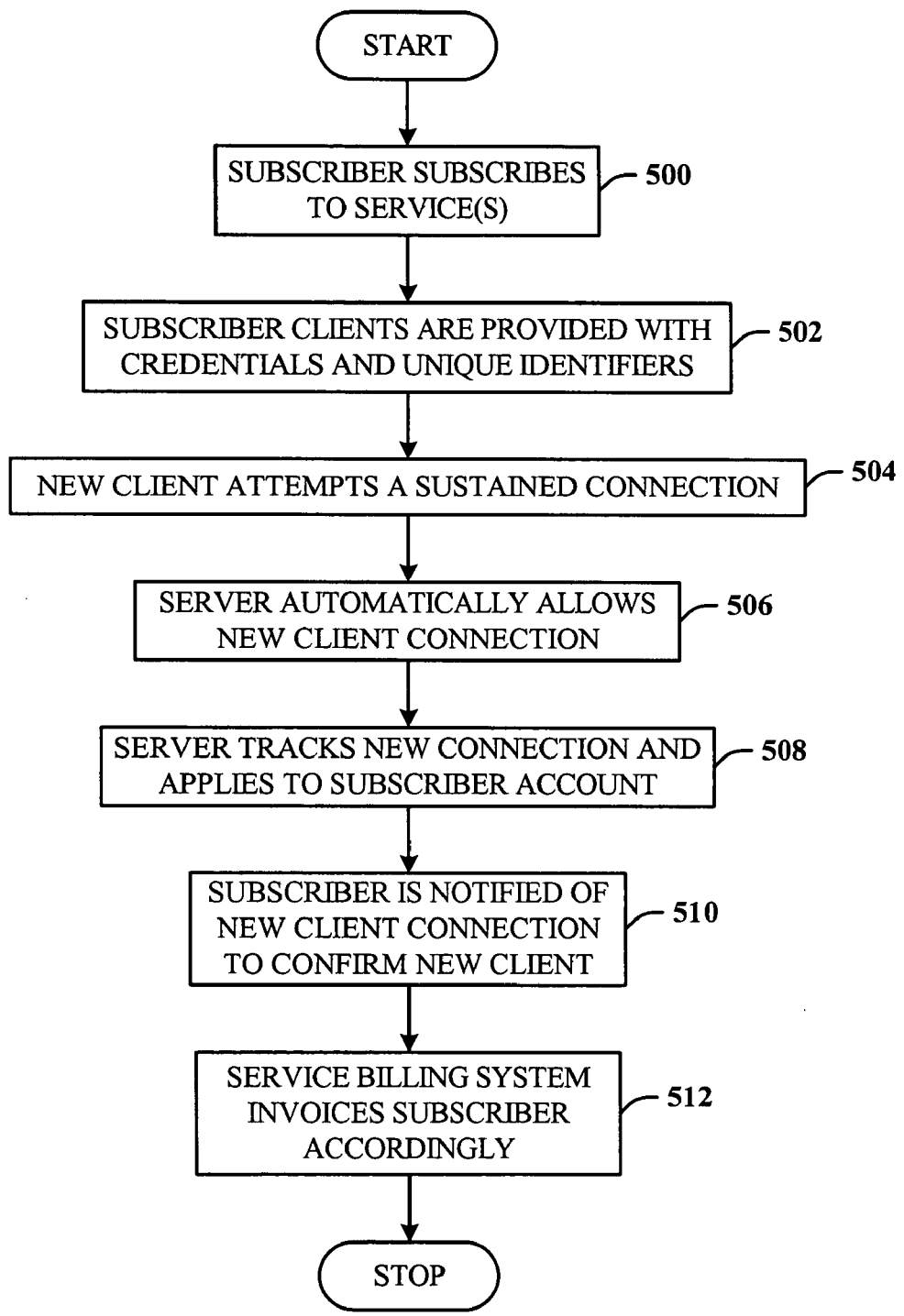
FIG. 5 illustrates a flow chart of a process of the present invention that allows all subscriber clients access and bills the subscriber accordingly.

Referring now to FIG. 5, there is illustrated a flow chart of a process of the present invention that allows all subscriber clients access and bills the subscriber accordingly. In this implementation, the churn counter is allowed to increase beyond the pre-set limit, and the value recorded by the counter is considered the number of clients in service on a given day. The billing system reviews each entry in the log file and for each unique subscriber, tracks the churn rate. Additionally, the number of times a client re-enters service within a particular period (e.g., six months) is also measured. Any client that enters service more than the specified number of times in a given interval is considered an additional client for the purposes of the billing calculation. Therefore, rules tracking is performed not for the purpose of denial of service but for metering usage for an accurate bill.

At 500, the subscriber subscribes to the service(s). At 502, each subscriber client is associated with subscriber credentials and uniquely identified. The credentials can include an e-mail address and/or user password, for example. At 504, a subscriber client attempts a sustained connection to the service. At 506, the server automatically allows the new client to authenticate and stay connected. At 508, the server tracks the new client connection activity via an activity log and applies the activity information to the subscriber account. At 510, the subscriber is notified of the new client subscription to provide feedback as one means of assuring that the client is one of the subscriber clients. The notification can include sending the new client credentials back to the subscriber such that the subscriber can verify that the new client belongs to the subscriber system. If not, the subscriber can readily notify the service to prevent access. At 512, a billing process is run periodically to determine how many clients accessed the server system in the preceding period so that the appropriate charges can be levied against the subscriber. The billing system would examine all the logged access events, determine the number of clients who simultaneously use the system, and generate a bill according the pre-defined rating for that number of clients. The process then reaches a Stop block.

Figure 6A:
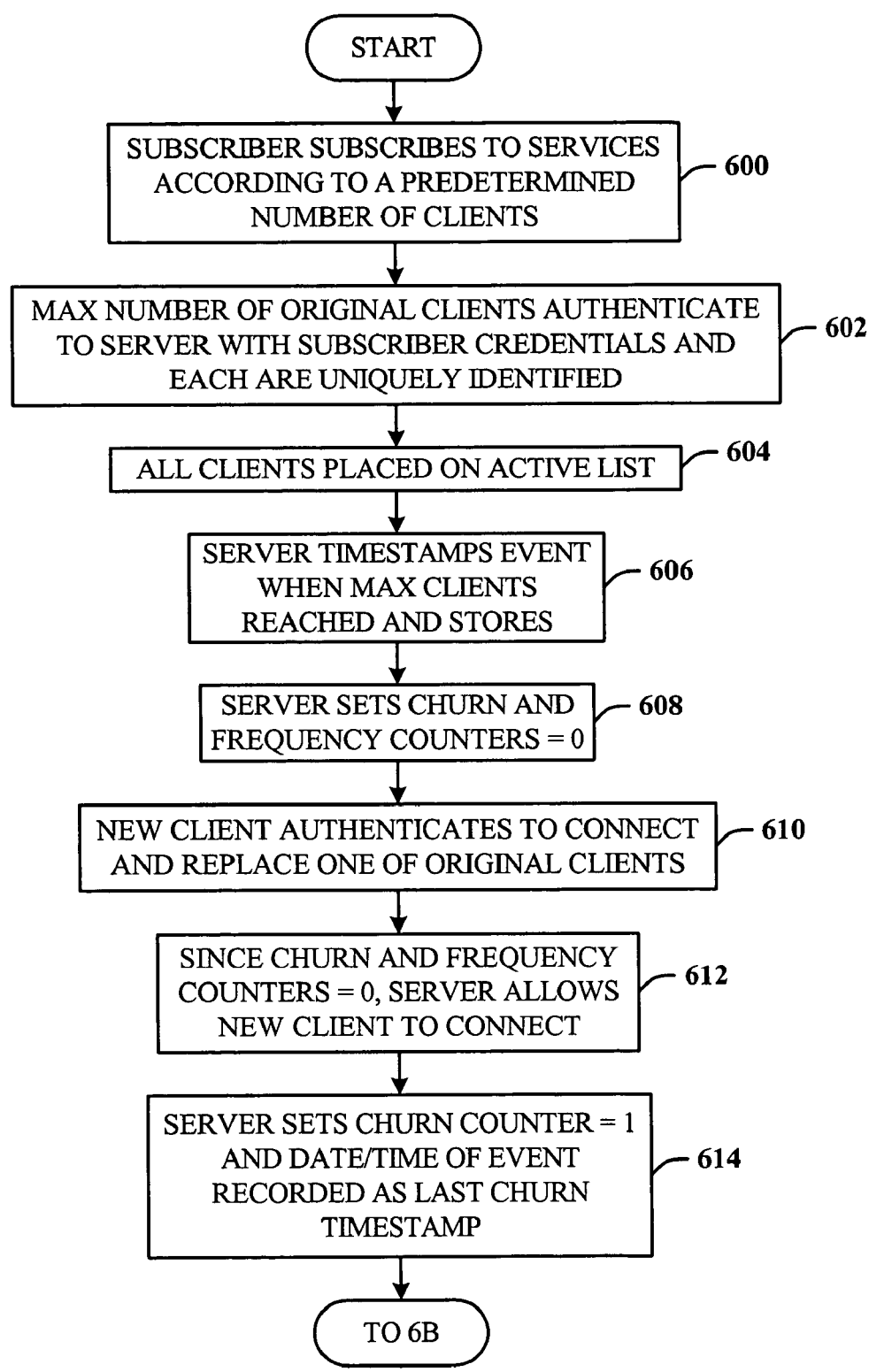
FIG. 6A and FIG. 6B illustrate a methodology that provides more detail of an implementation of the general scheme described in accordance with FIG. 3 and FIG. 4 of the present invention.
Figure 6B:
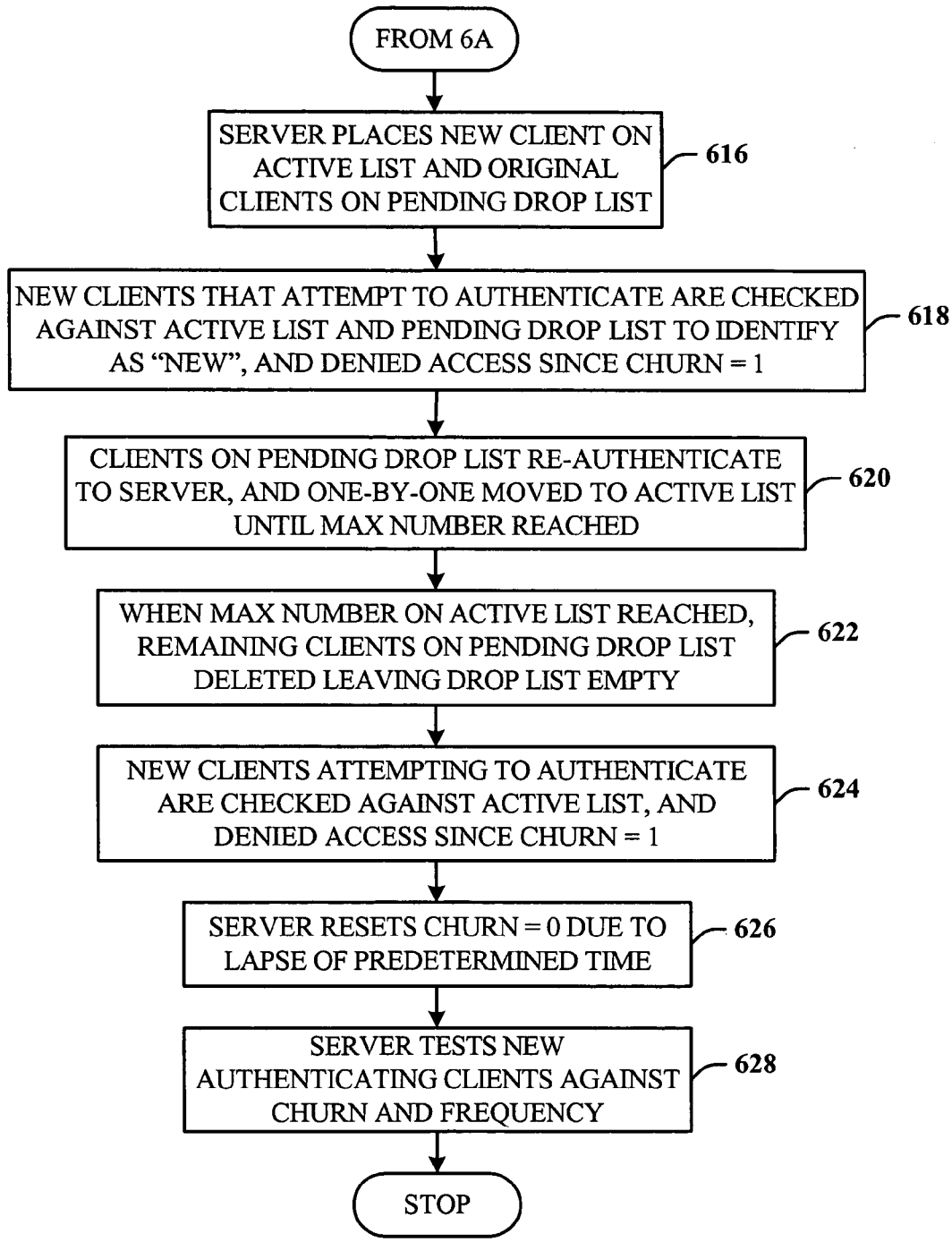

Referring now to FIGS. 6A and 6B, there is illustrated a methodology that provides more detail of an implementation of the general scheme described in accordance with FIG. 3 and FIG. 4 of the present invention. In particular, the details comprise aspects related to how active lists are maintained using uniquely identified clients, using active lists and pending delete lists, and how churn, frequency, and maximum number of clients rules are checked. For purposes of discussion, and not by limitation, assume that a subscriber is allowed a maximum of three concurrent client subscriptions for access to a server, the allowable churn is one client per day, and the allowable re-subscription frequency for a client is twice per year (that is, the third time per year will be denied). The choice of twice per year is to allow a machine to be taken out of service for repair, replaced with a "loaner" machine, and then placed back into service when it comes back from repair. Assume further that the subscriber owns six client machines labeled A, B, C, D, E and F, where A, B, and C are denoted the "original" clients that have concurrently connected to the services.

At 600, the subscriber subscribes to the services according to a predetermined number of three clients. At 602, original clients A, B, and C are powered up and configured to access the server. The original clients authenticate to the server with subscriber credentials and are uniquely identified as clients A, B, and C. The server is now automatically configured to assume that clients A, B, and C are the clients entitled to service. At 604, the server places clients A, B, and C on the active list. The subscriber has reached the maximum of concurrently allowed subscriptions. At 606, the server records the date and time when the subscriber reached the maximum number of allowed subscriptions. At 608, the server sets the churn counter to zero and frequency counter to zero.

In the event that the subscriber wishes to turn off client A and substitute new client D, the subscriber simply does so. At 610, new client D now authenticates to the server for service. At 612, the server checks the churn counter and, since it is set to zero, allows new client D to access the resource, applying a liberal policy of assuming that one of the existing machines on the active list will drop out. At 614, the churn counter is now set to "1", and the date and time of this change is recorded as "last churn timestamp".

Continuing with FIG. 6B, at 616, the server now places new client D on the active list, and moves original clients A, B, and C from the active list to a "pending drop" list. At 618, clients B and C re-authenticate. New clients that attempt to authenticate are checked against the active list and pending drop list to identify them as "new", but will be denied access, since the churn is one. At 620, clients on the pending drop list re-authenticate to the server, and one-by-one are moved back to the active list. Thus, the server moves original clients B and C back to the active list. Once the active list is full again (as in this example where once again there are the maximum of three computers on the active list), then all remaining computers on the pending drop list are in fact assumed to be out of service, and removed from the list, as indicated at 622 original client A is dropped).

If on the same day, new client E tries to enter service, the server checks the last churn timestamp and, since it is less than a day from the last churned client (i.e., client A), the server checks the churn counter. Since the churn counter is set to the maximum of one, new client E is denied access to the server, as indicated at 624. At 626, when a specified period of time has elapsed (in this example, one day from the time of the last client entering service), the churn counter is reset to zero. For example, if client E attempted to enter service more than twenty-four hours after the first churned client, then the server would check the last churn timestamp. Since the timestamp was set more than twenty-fours hours ago, the server will zero the churn counter and admit client E into service. In this example, the churn is measured discretely period-by-period. However, a running average could also be employed. At 628, the server process continues by testing new authenticating clients against limits, churn, and frequency, and other processes accordingly.

Whenever a client is placed into service by placing the client identifier on the active list, the date and time of that event is also recorded. This can be recorded in a central database on a per client basis. This is a secure way of storing the information and places it under tight control of the server. Thus, in accordance with the above example, had clients D and/or E been associated with entering service twice in the last three months, then client D and/or E would also be denied service and not allowed to enter the active list.

If the number of concurrent clients has not been exceeded, then the new client will be allowed a sustained connection to receive services. However, if the number of concurrent clients has been exceeded, a new client attempting to connect may be considered to have "bumping" rights to bump a connected client off the active list. By processing additional rules, it can be determined if the new client has sufficient rights to bump an existing concurrent client. Referring to the above example, at 616, when client D is placed on the active list, clients A, B, and C are moved to the pending drop list for the re-authentication process. The client that is not allowed back onto the active list (i.e., client A) has effectively been bumped from obtaining any more services. This is a straightforward example of replacing one client with another under the subscription scheme of the present invention.

However, in this embodiment, it is contemplated that one of the clients A, B, or C is not be pulled offline for replacement, but may simply be temporarily suspended from further service until a new connecting client with a higher priority has completed servicing. For example, assume the subscriber currently has clients A, B, and C connected for obtaining and in the process of obtaining services. Instead of the subscriber manually removing one of the existing concurrent clients to make room for a new client D, the subscriber can simply provide the connection for client D to the server, and let the server determine (according to predetermined criteria) which of the existing concurrent clients should be temporarily bumped to make room for the new client D.

The criteria can be based, for example, on which of the existing connected clients has already been connected the longest, which client is associated with the lowest priority of data servicing, and which client is the slowest or the fastest in terms of client system performance. Any number or rules can be imposed singularly or in combination to arrive at which connected client should be bumped to allow the new client D to connect.

It is further within contemplation of the present invention that the connected client selected to be bumped can be disconnected immediately, in the middle of a servicing process, or after the current servicing process has completed. Still further, the system is sufficiently robust to determine of the services currently being obtained by the selected client comprise a string of several services that should not be interrupted, since re-servicing would be more costly in time and resources then allowing the string of services to complete before disconnecting the selected client.

Figure 7:
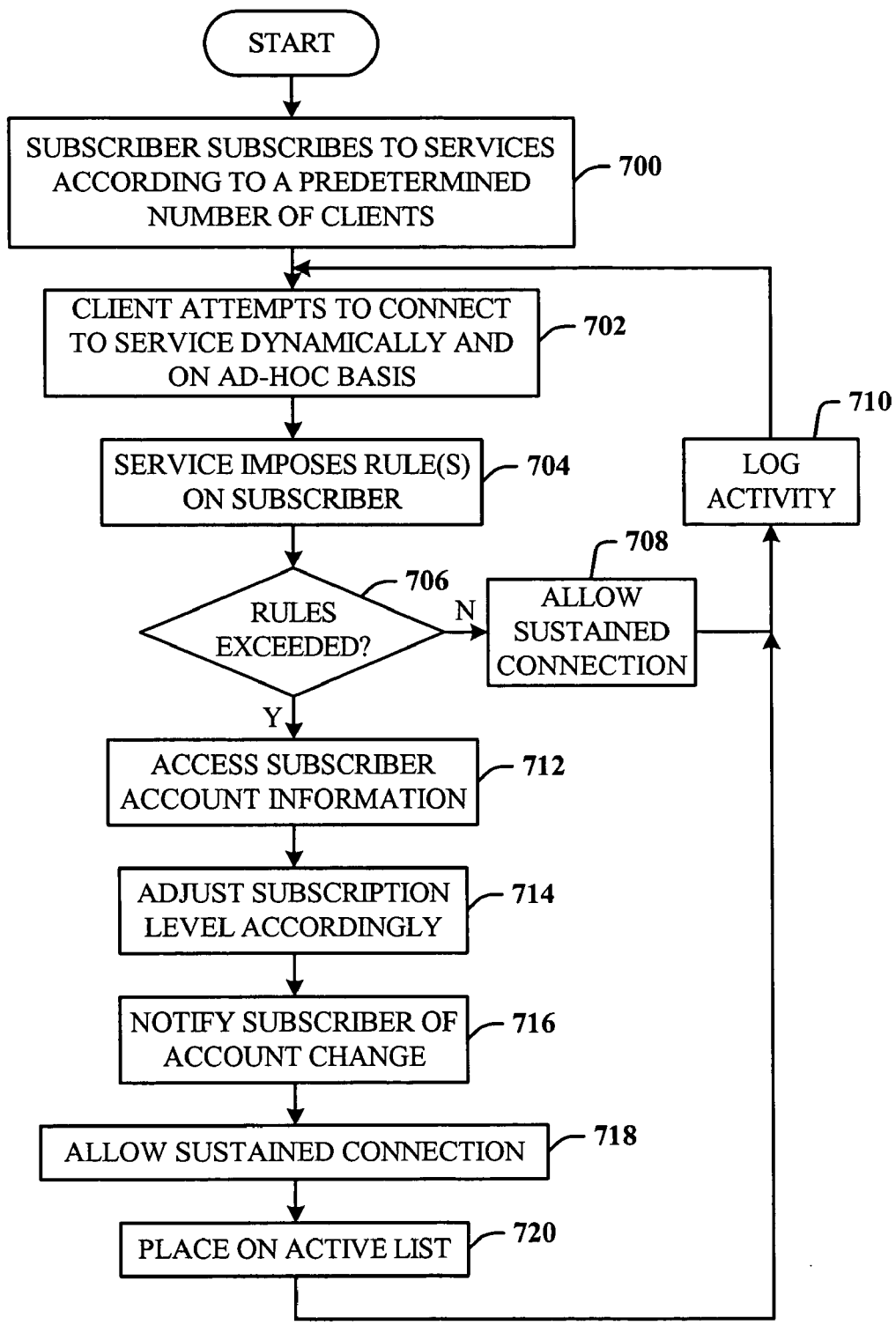
FIG. 7 illustrates a flow chart of a subscription process that adjusts subscription rules according to subscriber activity and account information.

Referring now to FIG. 7, there is illustrated a flow chart of a subscription process that adjusts subscription rules according to subscriber activity and account information. At 700, the subscriber subscribes to one or more services according to a predetermined number of clients. At 702, a new subscriber client attempts to connect to the service dynamically and on an ad-hoc basis. At 704, the service imposes one or more rules on the subscriber account. At 706, the system determines if any one of the rules imposed has been broken (or exceeded). If no, flow is to 708 to allow a sustained connection. At 710, the activity is logged, and flow is back to 702 to process the next attempted client connection.

If any of the rules has been exceeded, flow is from 706 to 712 to access subscriber information. The account information can include subscriber preferences that allow the subscription service to exceed the rules limit according to any number of criteria stipulated in the preferences. For example, since each client has credentials and/or a unique identifier, the credentials/identifier can further indicate to the service how to address the rules with respect to this specific client. If the credentials indicate that this client processes information related to finances, the client can be placed on a priority list for receiving the next connection. The service can then notify the client when a connection becomes available. Alternatively, the client can be allowed to connect and the subscription level is adjusted accordingly. At 714, the system adjusts the subscription level accordingly to account for the increased client connections. At 716, the subscriber is notified of the updated subscription level. At 718, the system allows the client a sustained connection. At 720, the client is placed on the active list. Flow is then back to 710 to log this activity.

In yet another implementation, the limit on subscribing clients is then reduced back to the rules limit after the "priority" client has disconnected. The subscriber is then billed according to this brief "overage" during this period of time.

Figure 8:
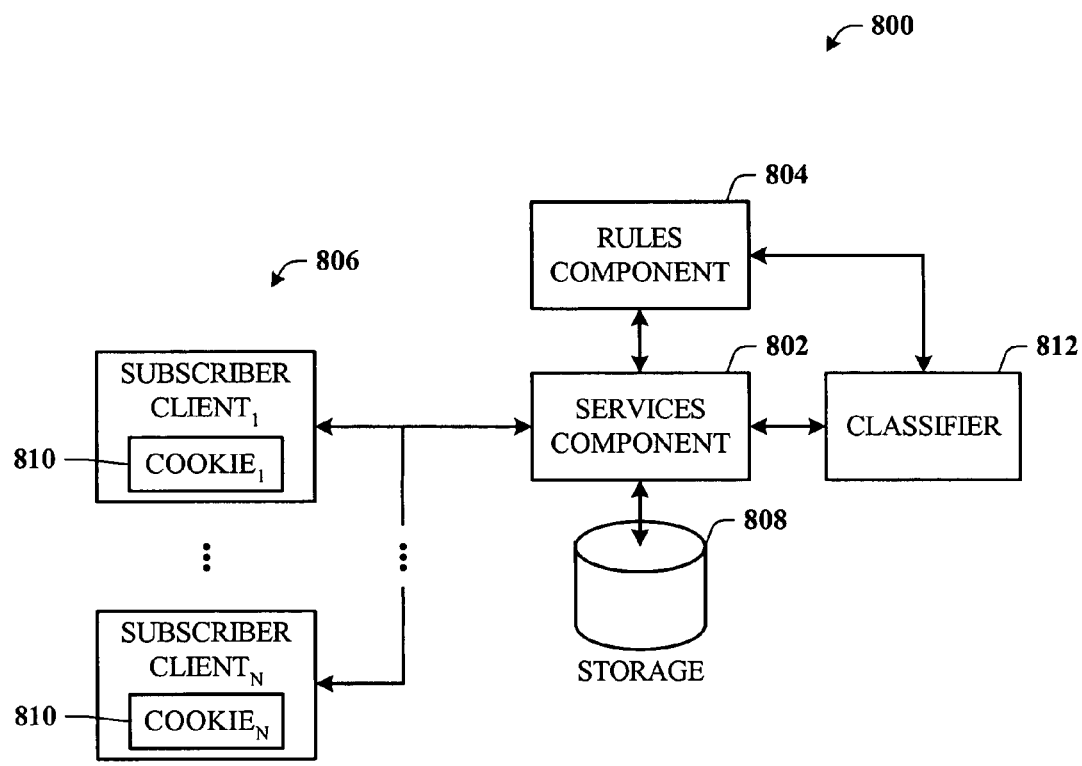
FIG. 8 illustrates a system that utilizes artificial intelligence in accordance with the present invention.

Referring now to FIG. 8, there is illustrated a system 800 that utilizes cookies in accordance with the present invention to track which subscribers are returning for service. The system 800 includes a service component 802 that provides one or more services to which a subscriber can subscribe. A rules component 804 interfaces to the services component 802 to facilitate imposing rules on subscribers according to subscriber account information and level of service provided to the particular subscriber. It is to be appreciated that the services component 802 can be configured to impose the same rules on all subscribers. Connecting to receive the services from the services component 802 are a plurality of clients 806 (denoted Subscriber Client$_1$ . . . Subscriber Client$_N$). A client connects for services by transmitting a credential and/or unique identifier to the services component 802 for authentication and confirmation that the client should be considered for a sustained connection in order to obtain the services. Once authenticated, the client is added to the active list, which list can be stored on a storage component 808. The storage component 808 can include a high-speed memory, mass storage system, or database system, for example, any of which can be located local to the server of the services component 802, or located remotely therefrom.

However, the use of a central database as storage when scaling to potentially millions of clients is inefficient. Alternatively, this information can be stored with each client such as by having the server set a cookie on the client with the timestamp (or multiple timestamps corresponding to the multiple times this client has entered service from its non-subscribed state). If the cookie mechanism is employed, since the client is nominally under the control of the subscriber, then additional steps can be taken to ensure that the cookies cannot be deleted or spoofed. One way is to have some authenticity check on the identity of the client code to ensure that it has been written by the system developers, as well as a secure storage for the cookies on the local disk to assure that any tampering with the cookie will be detected by the client program and/or by the server. If the server detects (by examining the central database or the cookie) that a client has entered service more than the allowed number of times per specified time interval, then it will also be denied access. Thus, the clients 806 are capable of processing cookies in accordance with the present invention. The clients 806 each include respective cookies 810 (also denoted Cookie$_1$ . . . Cookie$_N$).

In an alternative implementation of the present invention, various artificial intelligence based schemes can be employed for carrying out aspects of the subject invention. For example, a process for determining when or how a rule should be applied can be facilitated via an automatic classifier system and process 812. The classifier 812 interfaces to both the services component 802 and the rules component 804 to process services and rules information.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of subscription-based systems, for example, attributes can be client credentials and/or unique identifiers or other data-specific attributes derived from the client information of the subscriber, and the classes are categories or areas of interest (e.g., levels of service).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) may be used to automatically determine according to a predetermined criteria when to impose a rule against a given client, when to impose a rule against a given subscriber, how to impose the rule against the given client and subscriber, when and how to alter concurrency limits, and churn/frequency parameters, when and how to bill a subscriber, and when to allow a subscriber client to connect according to the level of service and past historical data, for example.

More specifically, the classifier 812 can be employed to analyze the credentials being submitted by a connecting client, and modify the rules accordingly to allow the client to connect where a concurrency limit rule has been imposed and exceeded. The classifier 812 can also be used to perform statistical analysis to predict when to update the level of service based on the load presented by a particular subscriber by the increasing number of attempted connections, and/or to adjust the level of service based purely on the attempted logins to the services, for example.

In another implementation, where typical conditions involve multiple subscribers to the services of the services component 802, the classifier 812 can be employed to adjust levels of priority access when the time to connect to the services in increases or decreases. For example, if one subscriber has paid for a higher level of service, the clients of that subscriber will be given a higher level of priority by allowing that subscriber's clients to connect more often and even before the lower level subscriber, where conflicts may exist.

In yet another implementation, where the services component 802 hosts several different kinds of services, the classifier 812 can be employed to control what subscriber clients can connect, when to connect, and to what services. This is useful when the system begins to become overloaded.

The classifier 812 can also be used to determine when to shift from storing client credentials locally on the storage device 808 to using cookies on the clients. Thus, as the services system becomes more burdened by the number of clients that attach, the classifier can automatically convert over to issuing cookies to limit the burden on the system.

The classifier 812 can also be employed in conjunction with the "bumping" aspect of the present invention to more "intelligently" select the concurrent client to be bumped, and determine the best time to allow the selected concurrent client to be bumped, based implicit and explicit learning according to historical data stored in the activity log, current trends in connecting and replacing clients for servicing, the type of client hardware (considering, for example, the bandwidth capabilities of the hardware and software components), the type of client (whether a portable client, desktop client), type of operating system of the clients, amount of servicing required during any given connection (based on, for example, the time required, and if the servicing requires a duplicate download of the same data to perform a consistency check), to name a few.

As can be seen, the use of the classifier 812 significantly enhances the capabilities of the present invention. Thus, any statistical analysis, trending, learning, and predicting functions are contemplated in accordance with the present invention.

Figure 9:
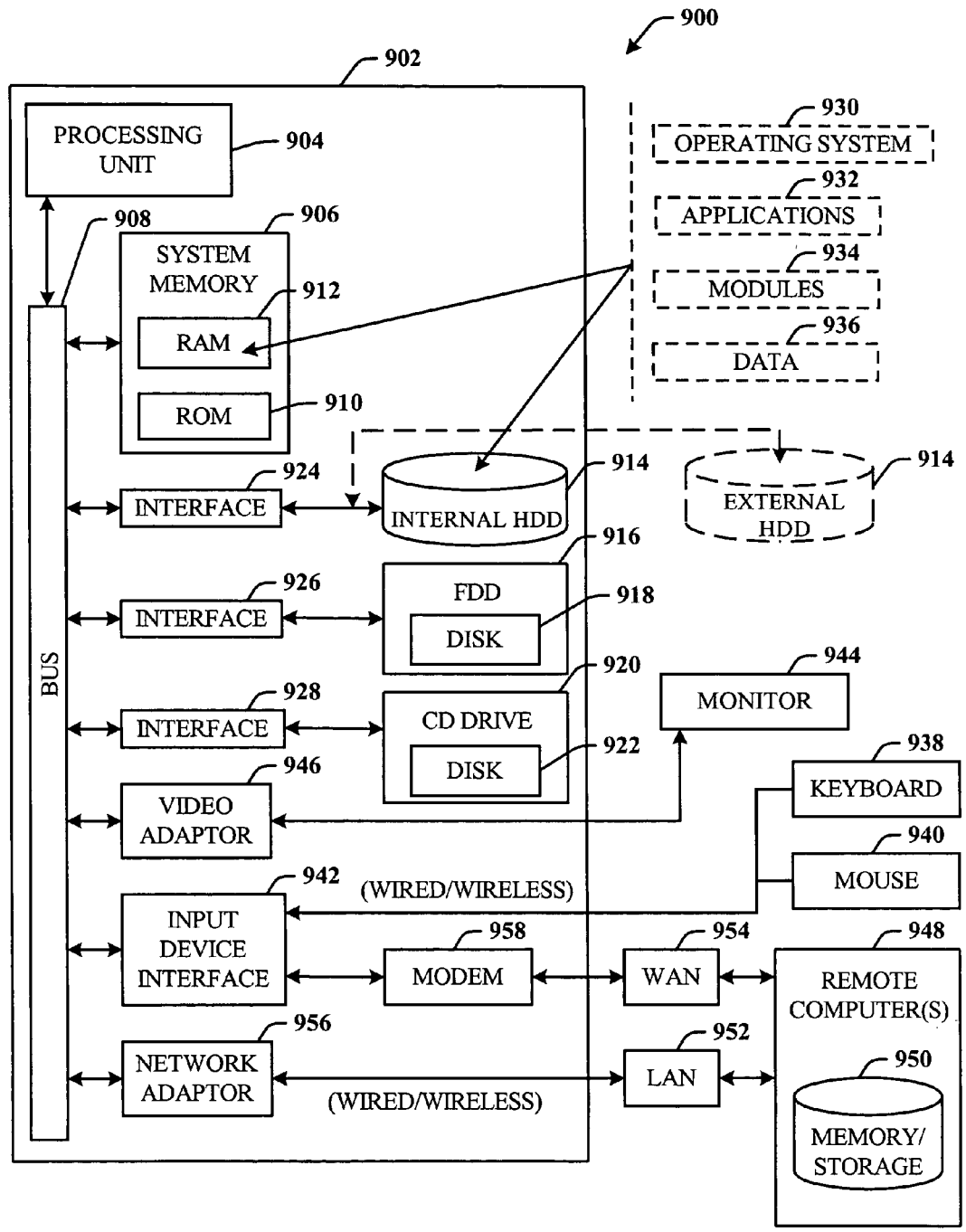
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the present invention, FIG. 9 and the following discussion are intended to provide a brief, general description of a suitable computing environment 900 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 may be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a nonvolatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 912, including an operating system 930, one or more application programs 932, other program modules 934 and program data 936. All or portions of the operating system, applications, modules, and/or data can also be cached in the RAM 912.

It is appreciated that the present invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but may be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections via wired and/or wireless communications to one or more remote computers, such as a remote computer(s) 948. The remote computer(s) 948 may be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956. When used in a WAN networking environment, the computer 902 can include a modem 958, or is connected to a communications server on the LAN, or has other means for establishing communications over the WAN 954, such as by way of the Internet. The modem 958, which may be internal or external and a wired or wireless device, is connected to the system bus 908 via the serial port interface 942. In a networked environment, program modules depicted relative to the computer 902, or portions thereof, may be stored in the remote memory/storage device 950. It will be appreciated that the network connections shown are exemplary and other means of establishing a communications link between the computers may be used.

The computer 902 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 10:
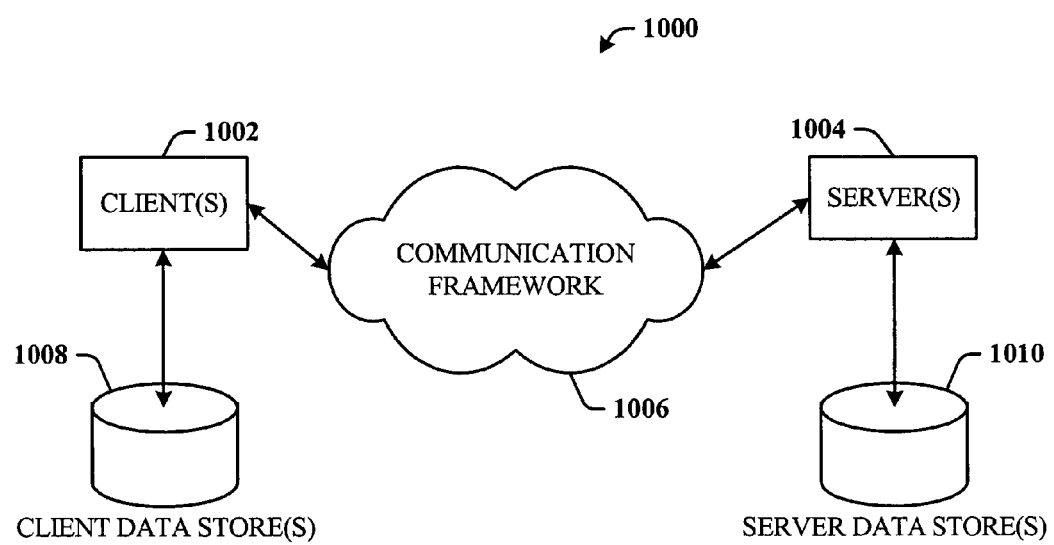
FIG. 10 illustrates a schematic block diagram of an exemplary computing environment in accordance with the present invention.

Referring now to FIG. 10, there is illustrated a schematic block diagram of an exemplary computing environment 1000 in accordance with the present invention. The system 1000 includes one or more client(s) 1002. The client(s) 1002 can be hardware and/or software (e.g., threads, processes, computing devices). The client(s) 1002 can house cookie(s) and/or associated contextual information by employing the present invention, for example. The system 1000 also includes one or more server(s) 1004. The server(s) 1004 can also be hardware and/or software (e.g., threads, processes, computing devices). The servers 1004 can house threads to perform transformations by employing the present invention, for example. One possible communication between a client 1002 and a server 1004 may be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications may be facilitated via a wired (including optical fiber) and/or wireless technology. The client(s) 1002 are operably connected to one or more client data store(s) 1008 that can be employed to store information local to the client(s) 1002 (e.g., cookie(s) and/or associated contextual information). Similarly, the server(s) 1004 are operably connected to one or more server data store(s) 1010 that can be employed to store information local to the servers 1004.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates management of a subscription service, the system comprising:
    a processor;
    a rules component, running on the processor, that processes a set of rules in accordance with the subscription service of a subscriber,
    wherein the set of rules comprising:
        a rule that automatically provides a license to a predetermined number of clients, and prevents anonymous rotation of more clients than the predetermined number of clients that are authorized by the license;
        a churn rule that facilitates control of how often one of the clients that are concurrently accessing the subscription service can be replaced with a new client; and
        a frequency rule that facilitates control of a number of times that one of the clients can leave the subscription service and re-enter the subscription service in a given period of time;
    a services component that uses the set of rules to automatically enforce the subscription service, in part, according to the number of concurrently connected clients of the subscriber; and
    a tracking service that tracks client activity under the subscription service by managing an active list of concurrently connected clients such that the subscriber can be billed accordingly.

2. The system of claim 1 is employed in at least one of a client/server topology and a peer-to-peer topology.

3. The system of claim 1, the concurrently connected clients each include a cookie that facilitates enforcement of the subscription service.

4. The system of claim 1, each of the connected clients is placed on an active list of allowed clients.

5. The system of claim 1, if the number of concurrently connected clients is exceeded, no other clients of the associated subscriber are allowed to connect to the services component.

6. The system of claim 1, wherein the set of rules includes a rule that allows an unlimited number of concurrently connected clients for the subscriber.

7. The system of claim 1, the rules are applied automatically to a client of the subscriber as the client attempts to connect on an ad hoc basis.

8. The system of claim 1, wherein the active list is populated and depopulated dynamically according to a client respectively connecting to and disconnecting from the services component.

9. The system of claim 1 is employed in a peer-to-peer topology where one or more rules imposed by a first peer client are at least one of different, overlapping, and identical to more rules imposed by a second peer client.

10. The system of claim 1, further comprising a classifier that facilitates the performance of rules processing according to an inference.

11. A system that facilitates control of client access to a service under a subscription service, the system comprising:
    a processor;
    a rules component, running on the processor, that processes a set of rules in accordance with the subscription service of a subscriber,
    wherein the set of rules comprising:
        a rule for providing a mechanism for ensuring that a subscriber is prevented from adding an unlimited number of clients or cycling clients in and out of a pool to effectively maintain the subscription service on a set of client computers to which the subscriber is entitled;
        a churn rule for setting how often one of the client computers can be placed into the subscription service replacing other one of the client computers connected to the subscription service; and
        a frequency rule for limiting on number of times a given client can re-subscribe to the subscription service in a given period of time;
    a services component that uses the set of rules to facilitate automatic enforcement of the subscription service according to a number of concurrently connected clients of the subscriber; and
    a tracking service that tracks client activity under the subscription service by managing an active list of the concurrently connected clients such that the subscriber can be billed accordingly.

12. The system of claim 11, the set of rules enforced in accordance with the subscriber are at least one of the same, partially overlapping, and different then rules enforced in accordance with a different subscriber.

13. The system of claim 11, if the number of concurrently connected clients is exceeded, no other clients of the associated subscriber are allowed to connect to the services component.

14. The system of claim 11, further comprising a classifier that facilitates determining when to switch from storing client information locally to storing client information on the client.

15. A method of managing a subscription service, comprising:
    providing access to a service in accordance with the subscription service;
    automatically controlling access to the service according to a set of rules that are based at least in part on a number of clients that are concurrently accessing the service, wherein the automatically controlling access to the service according to the set of rules comprising:

providing a mechanism that prevents a subscriber from adding an unlimited number of clients or rotating clients in and out of the pool to effectively maintain the service on a set of client computers to which the subscriber is entitled;

processing a churn rule of the set of rules that facilitates control of how often one of the clients that are concurrently accessing the service can be replaced with a new client; and processing a frequency rule of the set of rules that facilitates control of a number of times that one of the clients can access the service in a given period of time; and tracking client activity under the subscription service by managing an active list of the concurrently accessed clients such that the subscriber can be billed accordingly.

16. The method of claim 15, further comprising automatically enforcing at least one of the churn rule and the frequency rule to deny access to a new client seeking access to the service.

17. The method of claim 15, further comprising:
processing the churn rule to allow a subscriber of the subscription service to exceed the churn rule as an event; and
billing the subscriber according to each event.

18. The method of claim 15, further comprising:
processing the set of rules by allowing a subscriber of the subscription service to exceed selected ones of the set of rules;
changing a level of service to a new level of service according to the selected ones of the set of rules that were exceeded; and
thereafter, billing the subscriber at the new level of service.

19. The method of claim 15, further comprising:
processing the set of rules by allowing the subscriber of the subscription service to exceed selected ones of the set of rules;
changing a level of service to a new level of service according to the selected ones of the set of rules that were exceeded; and
dropping back to the level of service after the selected ones of the set of rules that were exceeded, have not been exceeded for a predetermined period of time.

20. A computer-readable storage medium having computer-executable instructions for performing a method of managing a subscription service, the method comprising:
automatically providing a license to a predetermined number of clients, and limiting anonymous cycling of more clients through the subscription service than the predetermined number of clients that are authorized by the license;
facilitating automatic enforcement of the subscription service according to at least a churn parameter and a frequency parameter;
providing access to a service in accordance with the subscription service;
tracking the access to the service according to an active list of existing clients that are concurrently accessing the service;
processing the access to the service by a new client; and
automatically enforcing the number of clients concurrently accessing the service;
wherein the churn parameter includes a limit on a number of clients that can be replaced in a given period of time; and a frequency parameter includes a limit on a number of times a given client can be re-subscribed to the service over the given period of time.

21. The method of claim 20, the act of processing further comprises at least one of:
denying access to the new client according to how often one of the existing clients that are concurrently accessing the service has been replaced with a new client; and
denying access to the new client according to a number of times that the new client has accessed the service in a given period of time.

22. The method of claim 20, the act of processing further comprises:
authorizing the new client to access the service;
placing the new client on the active list; and
moving existing clients off the active list to a pending list.

23. The method of claim 20, the act of enforcing further comprises:
bumping at least one of the concurrently connected clients;
re-authenticating a subset of the existing clients; and
moving the subset of re-authenticated clients back to the active list.

24. The method of claim 20, further comprising:
transmitting a cookie to a client; and
accessing the cookie during an authentication process to facilitate the client accessing the service.

25. A system, embedded in a computer-readable storage medium, that facilitates managing a subscription service, the system comprising:
means for automatically providing a license to a predetermined number of clients, and preventing access and use of the subscription service by more clients than the predetermined number of clients that are authorized by the license;
means for processing a churn rule of a set of rules that limits an a number of clients that can be replaced in a specified time interval by denying new clients to be admitted into the subscription service until the specified period of time has elapsed;
means for processing a frequency rule of the set of rules that facilitates control of a number of times that one of the clients can access the subscription service in a given period of time;
means for facilitates The performance of rules processing according to an inference;
means for providing access to a service in accordance with the subscription service;
means for processing the access to the service by a new client according a number of existing clients that are concurrently accessing the service;
means for tracking the access to the service; and
means for automatically enforcing the number of clients concurrently accessing the service in accordance with the set of rules.

26. The system of claim 25, further comprising at least one of:
means for authorizing the connecting client to access the service;
means for placing the connecting client on the active list; and
means for moving existing clients off the active list to a pending list.

27. The system of claim 25, further comprising at least one of:
means for re-authenticating a subset of the existing clients; and means for moving the subset of re-authenticated clients back to the active list.

28. The system of claim 25, further comprising:
   means for transmitting a cookie to a client; and
   means for accessing the cookie during an authentication process to facilitate the client accessing the service.

29. The system of claim 25, further comprising means for maintaining an active list of the existing clients that are concurrently accessing the service.

30. The system of claim 25, further comprising means for determining when to enforce selects ones of the rules.

31. The system of claim 25, further comprising means for determining priorities in how clients will be allowed to connect.

32. The system of claim 25, further comprising means for automatically adjusting a level of service for a subscriber according to client activity over a period of time.

33. The system of claim 25, the means for automatically enforcing is a table-free system wherein subscribers of the service are tracked without the need for an administrator to manage the tables.

* * * * *